United States Patent [19]

Bartlett et al.

[11] Patent Number: 5,316,848
[45] Date of Patent: May 31, 1994

[54] WATERPROOFING MEMBRANE

[75] Inventors: Keith R. Bartlett, Groveland; Robert F. Jenkins, Wakefield, both of Mass.

[73] Assignee: W. R. Grace & Co.-Conn., New York, N.Y.

[21] Appl. No.: 931,121

[22] Filed: Aug. 17, 1992

Related U.S. Application Data

[63] Continuation of Ser. No. 662,853, Mar. 1, 1991, abandoned.

[51] Int. Cl.$^5$ .............................................. C09J 7/02
[52] U.S. Cl. .................................... 428/351; 428/517; 428/703
[58] Field of Search ............... 428/351, 492, 515, 517, 428/40, 703

[56] References Cited

U.S. PATENT DOCUMENTS

| | | | |
|---|---|---|---|
| 3,642,559 | 2/1972 | Stokes | 428/56 |
| 3,663,350 | 5/1972 | Stokes | 428/220 |
| 3,853,682 | 12/1974 | Hurst | 428/40 |
| 3,900,102 | 8/1975 | Hurst | 428/40 X |
| 4,065,924 | 1/1978 | Young | 428/63 X |
| 4,386,981 | 6/1983 | Clapperton | 428/40 X |
| 4,585,682 | 4/1986 | Colarusso et al. | 428/57 |
| 4,589,804 | 5/1986 | Paeglis et al. | 428/57 X |
| 4,775,567 | 10/1988 | Harkness | 428/40 |
| 4,789,578 | 12/1988 | Twyford et al. | 428/40 |
| 4,948,652 | 8/1990 | Kelleher et al. | 428/332 X |
| 4,994,328 | 2/1991 | Cogliano | 428/489 |
| 5,132,183 | 7/1992 | Gaidis et al. | 428/492 X |

FOREIGN PATENT DOCUMENTS 989257 5/1976 Canada.

Primary Examiner—Jenna L. Davis
Attorney, Agent, or Firm—Craig K. Leon; William L. Baker

[57] ABSTRACT

The present invention relates to a waterproofing membrane comprising a carrier, a synthetic adhesive coated on one face of the carrier substrate, and a protective layer coated on the synthetic adhesive. The present invention also relates to a method of waterproofing post cast concrete structures comprised of affixing a carrier to the inside of a concrete form and post casting concrete, wherein the carrier further comprises a synthetic adhesive coated with a protective coating. Furthermore, the present invention relates to post cast concrete structures comprising a waterproofing membrane adhered to all or part of the exposed surface of said structure, wherein said membrane comprises a carrier, a synthetic adhesive coated on one face of the carrier substrate, and a protective coating on the synthetic adhesive and wherein the protective coating face contacts said structure.

23 Claims, 1 Drawing Sheet

WATERPROOFING MEMBRANE

This is a continuation application of application Ser. No. 07/662,853 filed Mar. 1, 1991, now abandoned.

FIELD OF THE INVENTION

The present invention relates to compositions and methods useful for waterproofing or dampproofing various water-penetrable materials used in building construction and other civil engineering projects. Specifically, the present invention relates to novel waterproofing membranes comprised of a carrier, a synthetic adhesive, and a protective layer.

BACKGROUND

Various materials used in building construction and other civil engineering projects such as roads and bridges are susceptible to water penetration resulting either from their inherent properties or imperfections such as cracks or pores. Reducing or eliminating water penetration through structures formed of these materials often is desirable such as for below grade building walls, and may be critical in certain structures such as those housing expensive electrical equipment or tunnels moving vehicular or pedestrian traffic under bodies of water.

In conventional waterproofing applications, the waterproofing material is post applied to an existing concrete structure. Available conventional waterproofing agents include ethylene propylene diene monomer (EPDM) sheets, polyvinyl chloride sheets, neoprene sheets, bentonite panels, built-up asphalt systems, coal tar-based, and other asphalt-based compositions. Asphalt-based compositions are currently preferred; most preferred are preformed, flexible sheet-like waterproofing laminates of a support film(s) and a bituminous layer(s) such as described in U.S. Pat. Nos. 3,741,856; 3,853,682; and 3,900,102. Bituthene ® brand of waterproofing is an example of a popular commercial membrane.

In many inner-city construction projects, the concrete foundation of one structure is poured very close to the foundation and/or property line of its neighbors. In these situations, a permanent concrete form is assembled along the exterior of the foundation. This is referred to as "vertical lagging" or simply "lagging". During a lagging operation, it is virtually impossible to apply a conventional post applied waterproofing membrane to the cured exterior of the foundation because the exterior surface of the concrete cannot be exposed. Accordingly, attempts have been made to affix a preapplied waterproofing membrane to the lagging form before the wet concrete is poured. Pre-applied waterproofing systems have been limited to Bentonite based products including Volclay Panels, Paraseal, and Claymax. These products rely on the ability of the bentonite clay to expand on contact with water and create an impermeable layer to water migration. However, the rigidity of the lagging material/structure actually prevents the formation of an expanded wet clay layer of a desirable density high enough to qualify the material as impermeable.

Conventionally preferred asphaltic based waterproofing membrane systems have several significant deficiencies when applied with the adhesive facing out in a lagging situation. First, they tend to oxidize during short periods of outdoor exposure and "mud cracks" develop on the adhesive surface. The oxidized surface does not bond to the post cast concrete. Second, the exposed adhesive surface of the waterproofing membrane tends to become fouled by the elements and by dust. Accordingly, it would be desirable to have an essentially non-tacky waterproofing membrane which can be pre-applied to a concrete form, resist chemical and physical changes from real time outdoor exposure, and develop a strong, fully adhered bond to the post cast concrete structure.

An objective of the present invention is to provide a waterproofing membrane which can be pre-applied to a concrete form and adhere strongly to the post cast concrete.

It is also an objective to provide a waterproofing membrane to resist chemical and physical changes during outside exposure and still have the capability for forming a strong and intimate bond to post-cast concrete.

It is further an objective to provide a highly weatherable waterproofing membrane which is essentially not tacky to the touch.

Another objective is to provide a non-asphaltic waterproofing membrane.

It is still further an objective to provide a waterproofing membrane which is particularly suited for vertical lagging construction.

Also, it is an objective to provide a method for pre-applying waterproofing membranes which become fully adhered to the resulting post cast concrete structure.

It is yet another objective to provide a novel waterproofing post cast concrete structure.

These and other objectives will become evident from the following:

SUMMARY OF THE INVENTION

The present invention relates to a waterproofing membrane comprising a carrier, a synthetic adhesive coated on one face of the carrier substrate, and a protective layer coated on the synthetic adhesive. The present invention also relates to a method of waterproofing post cast concrete structures comprised of affixing a carrier to the inside of a concrete form and post casting concrete, wherein the carrier further comprises a synthetic adhesive coated with a protective coating. Furthermore, the present invention relates to post cast concrete structures comprising a waterproofing membrane adhered to all or part of the exposed surface of said structure, wherein said membrane comprises a carrier, a synthetic adhesive coated on one face of the carrier substrate, and a protective coating on the synthetic adhesive, and wherein the protective coating face contacts said structure.

DETAILED DESCRIPTION OF THE INVENTION

Figure 1:
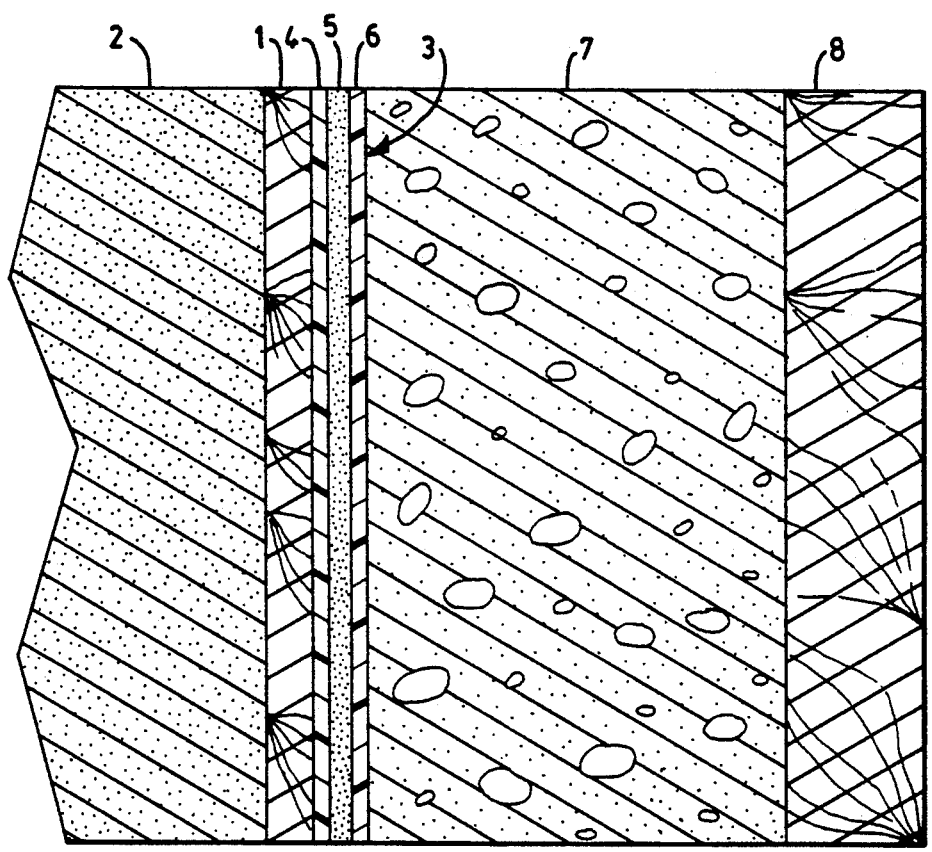
FIG. 1 is a lateral cross sectional view of an entire waterproofing system.

As was mentioned above, conventional waterproofing membranes, particularly asphaltic-based membranes, suffer from many problems when applied with the adhesive facing out in a lagging situation. First, although the subterranean portion of asphaltic-based membranes perform well when properly applied to post cast concrete with no outdoor exposure of the asphaltic based adhesive, the exposed adhesive portions do not weather well. Second, the adhesives currently used in the waterproofing industry tend to foul by the elements and by dust. Their tenacious stickiness may also to be a nuisance to construction workers. The present invention solves these problems through the discovery that a waterproofing membrane comprised of a carrier, a synthetic adhesive coated on one face of the carrier, and a protective layer coated on the synthetic adhesive can still become fully adhered with post cast concrete after real time outdoor weathering exposure.

The carrier layer of the present invention can be fabricated from a thermoplastic, rubber, or metal in the form of a continuous film, a woven material, or a non-woven material. Thermoplastics particularly suited for use in the present invention include high density polyethylene (HDPE), polyethylene teraphthate (PET), polystyrene (PS), polyvinyl chloride (PVC), polyamides (PA), or combinations thereof. Preferred carriers are thermoplastic films of HDPE, PET, or PVC. The most preferred carrier is a HDPE film. The thickness of the carrier film is from about 0.002 inches to about 0.030 inches, preferably about 0.020 inches.

As used herein, the term "synthetic adhesive" refers to non-bituminous and non-asphaltic adhesives. The adhesive layers of the present are selected from butyl rubber based adhesives, polyisobutylene based adhesives, polyisobutyl based adhesives, acrylic based adhesives, vinyl ether based adhesives, styrene-isoprene-styrene based (SIS) adhesives, styrene-ethylene-butylene-styrene based (SEBS) adhesives, styrene-butadiene-styrene based (SBS) adhesives, and combinations thereof. Pressure sensitive adhesives are preferred. Preferably, the synthetic adhesive is a pressure sensitive hot melt adhesive block copolymer of SIS, SBS or SEBS. Most preferably, the synthetic pressure sensitive hot melt adhesive is based on an SIS block copolymer. For a more detailed description of pressure sensitive adhesives, see *Satas, Handbook of Pressure Sensitive Adhesive Technology*, by Van Nostrand Reinhold Company, Inc. (1982), incorporated herein by reference.

The synthetic adhesive layer can optionally contain typical additives, such as, light absorbers (i.e. carbon black, benzotriazoles, etc.), light stabilizers (i.e. hindered amines, benzophenones), antioxidants (i.e. hindered phenols), fillers (i.e. calcium carbonate, silica, titanium dioxide, etc.), plasticizers, rheological additives, and mixtures thereof. Preferred synthetic adhesive layers contain light absorbers, light stabilizers, and antioxidants.

It has further been discovered that the adhesion to post cast concrete is improved when the synthetic adhesive layer has a penetration greater than about 30 decimillimeters (dmm) (150 g, 5 sec., 70° F.) as measured according to ASTM D 5-73, incorporated herein by reference.

The "adhesive" nature of the synthetic pressure sensitive adhesive has the added benefit in that side laps and end laps of the membrane are easily formed. The thickness of the synthetic adhesive layer is from about 0.005 inches to about 0.080 inches, preferably greater than about 0.020 inches.

The protective coating of the present invention is intended to have minimal tack and protects the synthetic adhesive from dust, dirt and the elements (particularly sunlight). At the same time, the protective coating does not hinder the ability of the membrane to form a fully adhered strong bond to the post cast concrete and the resulting structure.

The protective coating is selected from the group consisting of sytrene butadiene rubber based (SBR) coatings, carboxylated SBR based coatings, acrylic based coatings, polyvinylidene chloride based (PVDC) coatings, polyvinyl chloride based (PVC) coatings, ethylene vinyl acetate copolymer based (EVA) coatings, ethylene ethyl acetate copolymer based (EEA) coatings, polychloroprene based coatings, polyester based coatings, polyurethane based coatings, styrene-isoprene-styrene based (SIS) coatings, styrene-butadiene-styrene based (SBS) coatings, and combinations thereof. Preferred protective coatings are acrylic based coatings. Most preferred are styrene butylacrylate based coatings.

Elastomeric protective coatings are preferred. As used herein, the term elastomer means an elastic polymer having properties, similar to those of vulcanized natural rubber; namely the ability to be stretched to at least twice its original length and to retract very rapidly to approximately its original length when released. Elastomeric acrylic based coatings are preferred and elastomeric styrene butylacrylate based coatings are most preferred.

The protective coating may optionally contain typical additives, such as, light absorbers (i.e. carbon black, benzotriazoles, etc.), light stabilizers (i.e. hindered amines, benzophenones), antioxidants (i.e. hindered phenols), fillers (i.e. calcium carbonate, silica, titanium dioxide, etc.) plasticizers, rheological additives and mixtures thereof. Preferred synthetic adhesive layers contain light absorbers, light stabilizers, and antioxidants.

It has further been discovered that the adhesion to post cast concrete is greatly improved when the protective coating has a penetration greater than about 30 dmm (150 g. 5 sec., 70° F.) as measured according to ASTM D 5-73, incorporated herein by reference.

The thickness of the protective coating is from about 0.001 inches to about 0.020 inches, preferably about 0.005 inches.

The geometric configuration of the present invention comprises a carrier, the synthetic adhesive layer affixed to one face of the carrier, and the protective layer affixed to the exposed face of the synthetic adhesive layer. The layers can be affixed together by any means.

The preferred embodiment of the present invention comprises: a 0.020 inch high modulus thermoplastic HDPE carrier film; a 0.030 inch SIS block copolymer synthetic pressure sensitive adhesive layer containing from 0 to about 10% carbon black (most preferably about 2%), 0 to about 5% benzophenone, and 0 to about 5% benzotriazole; and about a 0.005 inch elastomeric styrene butylacrylate protective coating containing from about 0 to about 10% carbon black, (most preferably about 5%), 0 to about 5% benzophenone (most preferably about 5%), and 0 to about 5% benzotriazole (most preferably about 2.5%).

Unlike conventional waterproofing laminates, which are post-applied to existing concrete structures, the present waterproofing membranes are pre-applied to a substrate, and concrete is post cast against them.

In a typical application, the carrier face of the above waterproofing membranes is affixed to a form prior to post casting the concrete. As used herein, a "form" can be any container or any portion of a container which contacts cast concrete. This includes horizontal and vertical surfaces. In most applications, the carrier is affixed to the form by mechanically fastening the sheet membrane along the side and end edges. Neighboring sheets are placed such that the mechanical fasteners are completely overlapped, creating a surface which is continuous and free of punctures. In horizontal waterproofing applications, the waterproofing membrane can merely be rolled out without any means of fastening, although it is preferred to adhere or fasten the membrane to the substrate. In applications where the form is permanent, such as in vertical lagging operations, the carrier can also be adhered to the form through the use of adhesives.

As depicted in FIG. 1, in a lagging operation, the vertical lagging 1 is constructed against the exposed earth 2. The waterproofing membrane 3 is affixed to the form 1. The membrane comprises a carrier 4, which is in contact with the form, a synthetic adhesive 5 and a protective layer 6. Concrete 7 is poured against the waterproofing membrane. Of course, an inner form 8 is used to contain the lateral flow of concrete.

Generally, the present method involves applying a carrier/synthetic adhesive composition to a form (synthetic adhesive side exposed). Thereafter, the protective layer is painted or sprayed on. This insures fully adhered side and end laps, creating a continuous waterproofing barrier. It should also be pointed out that the present invention contemplates applying a carrier/synthetic adhesive/protective layer composition in a single step. Other obvious variations on this theme are also contemplated.

After the cast concrete has set sufficiently, the interior forms(s) are removed and the exterior "lagging" form may be optionally removed. This determination of cure is with the general skill of the art.

As used herein, making a structure "waterproof" means eliminating the ability of water to penetrate the structure. The present invention is used to make waterproof structures constructed of materials which are water-penetrable either inherently or as a result of imperfections such as cracks or pores. The present invention relates to a post cast concrete structure comprising the above waterproofing membrane adhered to all or part of the surface of the structure. Various civil engineering structures including, for example, building, bridges, roads, and tunnels, are made waterproof using the present invention. Building foundations are the preferred structures.

Once the concrete has set, the membrane forms a fully adhered, strong bond to the post cast concrete. After seven days, adhesion is believed to be about 95% of its final value (assuming no backfill pressure). The bond strength is at least about 2 lb/in (2"/min. 70° F.) as measured by the method described in ASTM D903-49, incorporated herein by reference. It has been discovered that this fully adhered bond (adhesion greater that 2 lb/in) is formed even after the protective coating face is exposed to over 40 megajoules of ultra violet light/square meter (MJUV/$m^2$) of real time outdoor exposure prior to casting (ASTM G7, incorporated herein by reference).

Contemplated equivalents of the present invention include other carriers, synthetic adhesives and protective coatings with characteristics similar to the specific materials described above. Additionally, waterproofing layers or components which do not interfere with the present invention are also contemplated. Alternative methods which result in a waterproofed structure utilizing analogous waterproofing membranes are also contemplated.

The following examples provide specific illustrations of the present invention, but are not intended to limit the scope of the invention as described above and claimed below:

EXAMPLE 1

Preparation of Waterproofing Membrane and Testing Procedure

A waterproofing sheet membrane is manufactured using a 20 mil HDPE carrier sheet coated on one face with 30 mil of an SIS based pressure sensitive hot melt adhesive, HM-1597 (H.B. Fuller, Vadnais Heights, Minn.), having a penetration of about 120 dmm. A styrene butylacrylate latex, Ucar-123 (Union Carbide, Cary, N.C.), having a penetration of about 50 dmm, is coated onto the adhesive side of the sheet membrane at a thickness of about 5 mil. Concrete is post cast against the protective coating surface of the waterproofing membrane composite after the protective coating surface has been exposed by up to 40 megajoules of ultraviolet light/square meter MJUV/$m^2$) of real time weathering on a 34° south facing wall in Phoenix, Ariz. (ASTM G7). Adhesion is measured at a constant rate of extension (CRE) of 2 in/min at 70° F. with an Instron (Model 100) CRE testing machine following ASTM D903-49. The concrete is allowed to cure a minimum of seven days at room temperature before testing.

EXAMPLE 2

Adhesion of Waterproofing Membrane to Post-Cast Concrete

Samples of the waterproofing membrane described in Example 1 which experience no outdoor weathering develop excellent adhesion to the post cast concrete of greater than 9 lb/in. Adhesion of samples which have received real time exposure decreases sharply with increasing real time exposure and is about 0 lb/in after exposures of about 10 MJUV/$m^2$. Adhesion remains at about 0 lb/in for all exposure periods greater than 10 MJUV/$m^2$.

EXAMPLE 3

Effect of the Addition of Light Absorbers to the Adhesive

A polybutylene oil dispersion, 20 wt% carbon black, is added to the adhesive of the membrane composite described in Example 1. The resulting adhesive, HL2232-X (H.B. Fuller) having a penetration of about 205 dmm, is about 2 wt% carbon black. A styrene butylacrylate latex, Ucar-123 (Union Carbide) having a penetration of about 50 dmm, is coated onto the adhesive side of the sheet membrane composite (HL2232-X adhesive) at a thickness of about 5 mil. Adhesion is measured after real time weathering as described in Example 1. Samples which experience no weathering develop excellent adhesion to the post cast concrete of greater than 9 lb/in. Adhesion to the concrete decreases as the samples experience increased exposure time and is about 1 lb/in after 40 MJUV/$m^2$.

EXAMPLE 4

Effect of the Addition of Light Stabilizers and Absorbers to the Protective Coating A protective coating formulation was prepared by mixing a 32 wt% carbon black aqueous dispersion WD-2345 (Daniel Products, Jersey City, N.J.), a hindered amine light stabilizer Tinuvin 292 (Ciba Geigy, Hawthorne, N.Y.), a benzotriazole light absorber Tinuvin 1130 (Ciba Geigy), and a styrene butylacrylate based latex Ucar-123 (Union Carbide), under high shear. The resulting formulation has a penetration of about 55 dmm and is 5% carbon black, 2.5% Tinuvin 1130, 5% Tinuvin 292, and 87.5% Ucar-123 based on solids. A 5 mil layer of the formulated protective coating is applied to the sheet waterproofing membrane composite (HM-1597 adhesive) described in Example 1. Samples which experience no outdoor weathering develop excellent adhesion to the post cast concrete of greater than about 7 lb/in. Adhesion to the cured concrete decreases as the samples experience increased exposure time and is about 1 lb/in after 40 MJUV/$m^2$.

EXAMPLE 5

Effect of the Addition of Light Stabilizers and Absorbers to the Adhesive and Protective Coating The adhesive formulation (HL2232-X) described in Example 3 and the coating formulation described in Example 4 are used in the sheet waterproofing membrane composite described in Example 1. Samples which experience no outdoor weathering develop excellent adhesion to the post cast concrete of greater than 9 lb/in. Adhesion to the cured concrete remains relatively consistent at about 7 lb/in up to 20 MJUV/$m^2$. Adhesion does not fall below about 3 lb/in for samples which have experienced up to 40 MJUV/$m^2$ of real time outdoor exposure. The membrane is fully adhered over the entire area between the sheet membrane system and the cured concrete, resulting in an effective waterproofing barrier.

What is claimed is:

1. A waterproofing membrane laminate, comprising:
   a carrier layer having first and second major faces, said first major face operative to permit said carrier layer to be disposed against a lagging form;
   a styrene-isoprene-styrene adhesive layer adhered to said second major face of said carrier layer, said adhesive layer being pressure sensitive and having a penetration greater than 30 dmm (150 g. 5 sec., 70° F.) according to ASTM D 5-73;
   an acrylic-based elastomeric coating layer adhered to said styrene-isoprene-styrene adhesive layer; and
   said styrene-isoprene-styrene adhesive layer and said acrylic based coating layer being operative, after seven days outdoor exposure to sunlight, to provide without cracks a fully adhered bond with concrete that is wet cast against said layers and allowed to set.

2. The laminate of claim 1 wherein said carrier layer comprises a material selected from the group consisting of a continuous film, sheet, woven, or non-woven thermoplastic, rubber, and metal material.

3. The laminate of claim 2 wherein said carrier layer material comprises material selected from the group consisting of high density polyethylene, polyethylene terephthalate, polystyrene, polyvinyl chloride, and polyamides.

4. The laminate of claim 2 wherein the thickness of the film is between 0.002 and 0.030 inches.

5. The laminate of claim 2 wherein said adhesive further comprises at least one material selected from the group consisting of light absorbers, light stabilizers, antioxidants, fillers, plasticizers, and rheological additives.

6. The laminate of claim 2 wherein said acrylic based coating layer comprises elastomeric styrene butylacrylate.

7. The laminate of claim 2 wherein said acrylic based coating layer comprises at least one material selected from the group consisting of light absorbers, light stabilizers, fillers, plasticizers, and rheological additives.

8. The laminate of claim 1 wherein said adhesive layer and said coating layer are operative to provide a fully adhered bond to concrete after 40 MJUV/$m^2$ of outdoor exposure.

9. The laminate of claim 2 wherein said first major face of said carrier layer is disposed against a lagging form, whereby wet concrete can be poured against said waterproofing membrane adhesive and elastomeric coating layers.

10. The waterproofing membrane laminate of claim 9 further comprising a mass of concrete that has been wet cast against said laminate which has been disposed against a lagging form, said concrete being allowed to set and thereby to form a fully adhered bond with said styrene-isoprene-styrene adhesive and elastomeric acrylic based coating layer.

11. The waterproofing membrane laminate of claim 10 wherein said laminate is disposed to said lagging form by mechanical fasteners.

12. The laminate of claim 10 wherein said lagging form comprises a vertical surface.

13. A waterproofing membrane laminate, comprising:
   a carrier layer having first and second major faces, said first major face operative to permit said carrier layer to be disposed against a lagging form;
   a non-bituminous adhesive layer adhered to said second major face of said carrier layer, said adhesive layer being pressure sensitive, and having a penetration greater than 30 dmm (150 g. 5 sec., 70° F.) according to ASTM D 5-73 and comprising material selected from the group consisting of butyl rubber based adhesives, polyisobutylene based adhesives, polyisobutyl based adhesives, acrylic based adhesives, vinyl ether based adhesives, styrene-isoprene-styrene based adhesives, styrene-ethylene-butylene-styrene based adhesives, and styrene-butadiene-styrene based adhesives;
   an elastomeric coating layer adhered to said non-bituminous adhesive layer; and
   said non-bituminous layer and said coating layer being operative, after seven days outdoor exposure to sunlight, to provide without cracks a fully adhered bond to concrete that is wet cast against said layers and allowed to set.

14. The waterproofing membrane laminate of claim 13 wherein said coating layer comprises styrene butylacrylate.

15. The waterproofing membrane laminate of claim 13 wherein an additive is contained in said coating layer, said additive being selected from the group consisting of light absorbers, light stabilizers, antioxidants, fillers, plasticizers, and rheological additives.

16. The waterproofing membrane laminate of claim 13 wherein said first major side of said carrier layer is disposed against a lagging form, whereby wet concrete can be poured against said waterproofing membrane adhesive and elastomeric coating layers.

17. The waterproofing membrane laminate of claim 13 wherein said laminate is fully adhered to concrete that has been cast against it.

18. The waterproofing membrane laminate of claim 13 further comprising a material selected from the group consisting of a light absorber, light stabilizer, antioxidant, filler, plasticizer, and rheological additive.

19. The waterproofing membrane laminate of claim 16 further comprising a mass of concrete that has been wet cast against said laminate which has been disposed against a lagging form, said concrete being allowed to set and thereby to form a fully adhered bond with said non-bituminous adhesive and elastomeric acrylic based coating layer.

20. The waterproofing membrane laminate of claim 19 wherein said laminate is affixed to said lagging form by mechanical fasteners.

21. The laminate of claim 19 wherein said lagging form comprises a vertical surface.

22. The laminate of claim 10 wherein said lagging form comprises a horizontal surface.

23. The laminate of claim 19 wherein said lagging form comprises a horizontal surface.

* * * * *